(12) United States Patent
Schurba (10) Patent No.: US 8,807,328 B2
(45) Date of Patent: Aug. 19, 2014

(54) CONVEYOR SYSTEM FOR CONVEYING OBJECTS, AND IMMERSION TREATMENT SYSTEM HAVING SUCH A CONVEYOR SYSTEM

(75) Inventor: Alexander Schurba, Boeblingen (DE)

(73) Assignee: Eisenmann AG, Boeblingen (DE)

( * ) Notice: Subject to any disclaimer, the term of this patent is extended or adjusted under 35 U.S.C. 154(b) by 0 days.

(21) Appl. No.: 13/522,352

(22) PCT Filed: Jan. 13, 2011

(86) PCT No.: PCT/EP2011/000115
§ 371 (c)(1),
(2), (4) Date: Sep. 11, 2012

(87) PCT Pub. No.: WO2011/085984
PCT Pub. Date: Jul. 21, 2011

(65) Prior Publication Data
US 2013/0026006 A1 Jan. 31, 2013

(30) Foreign Application Priority Data
Jan. 18, 2010 (DE) .......................... 10 2010 004 974

(51) Int. Cl.
*B65G 49/02* (2006.01)
(52) U.S. Cl.
USPC .................... 198/680; 198/468.6; 198/678.1; 198/343.2; 198/346.3
(58) Field of Classification Search
USPC .......... 198/343.1, 343.2, 346.3, 369.2, 465.4, 198/468.6, 678.1, 680, 817; 427/425; 118/53, 319, 416
See application file for complete search history.

(56) References Cited

U.S. PATENT DOCUMENTS

| | | | |
|---|---|---|---|
| 4,928,383 A * | 5/1990 | Kaczmarek et al. | 29/711 |
| 5,364,469 A * | 11/1994 | Wakabayashi | 118/423 |
| 5,725,669 A * | 3/1998 | Heckmann | 118/423 |
| 6,213,177 B1 * | 4/2001 | Kempe et al. | 144/248.4 |
| 6,390,279 B1 * | 5/2002 | Furukoshi | 198/465.1 |
| 6,419,983 B1 * | 7/2002 | Kreuzer | 427/242 |
| 6,673,453 B2 * | 1/2004 | Beavers et al. | 428/420 |
| 6,902,051 B2 * | 6/2005 | Dehne et al. | 198/346.3 |
| 7,383,939 B2 * | 6/2008 | Kreuzer et al. | 198/468.9 |
| 8,522,957 B2 * | 9/2013 | Robbin | 198/406 |
| 2005/0269205 A1 | 12/2005 | Ehrenleitner | |
| 2008/0247847 A1 | 10/2008 | Muller et al. | |

FOREIGN PATENT DOCUMENTS

| | | |
|---|---|---|
| DE | 101 21 055 A1 | 10/2002 |
| DE | 102 10 941 A1 | 10/2003 |
| DE | 10 2004 024 614 A1 | 12/2005 |
| DE | 10 2005 001 641 A1 | 7/2006 |
| WO | 03/076315 A1 | 9/2003 |

* cited by examiner

*Primary Examiner* — Douglas Hess
(74) *Attorney, Agent, or Firm* — Factor Intellectual Property Law Group, Ltd.

(57) ABSTRACT

A conveyor system for conveying objects, particularly vehicle bodies, in an immersion treatment system, comprising at least one conveyor carriage having a chassis supporting at least one load-bearing wheel that can rotate about a rotary axis. At least one object can be attached to a mounting device that can pivot about a pivot axis. The at least one load-bearing wheel runs on a guide rail. The conveyor carriage is moved along the guide rail using drive means. The rotary axis of the at least one load-bearing wheel and the pivot axis of the mounting device are disposed coaxially to each other. An immersion treatment system comprising such a conveyor system.

16 Claims, 6 Drawing Sheets

CONVEYOR SYSTEM FOR CONVEYING OBJECTS, AND IMMERSION TREATMENT SYSTEM HAVING SUCH A CONVEYOR SYSTEM

RELATED APPLICATIONS

This application claims the filing benefit of International Patent Application No. PCT/EP2011/000115, filed Jan. 13, 2011, which claims the filing benefit of German Patent Application No. 10 2010 004 974.3 filed Jan. 18, 2010, the contents of both of which are incorporated herein by reference.

TECHNICAL FIELD AND BACKGROUND OF THE INVENTION

The invention relates to a conveyor system for conveying objects, particularly for conveying vehicle bodies, in an immersion treatment system having
a) at least one conveyor carriage which
   aa) comprises a chassis supporting at least one load-bearing wheel which can be rotated about an axis of rotation
   ab) comprises a mounting device which can be pivoted about a pivot axis and on which at least one object can be mounted;
b) a guide rail along which the at least one load-bearing wheel runs;
c) drive means for moving the conveyor carriage along the guide rail.

The invention moreover relates to an immersion treatment system having
a) at least one immersion tank which can be filled with a treatment fluid in which objects to be treated, particularly vehicle bodies, can be immersed;
b) a conveyor system which can move the objects to be treated towards the immersion tank, into the interior of the immersion tank, out of the immersion tank and away from this latter.

In commercially known systems of this type, such as those which are used in immersion treatment systems for vehicle bodies and are described for example in DE 10 2004 024 614 A1, a plurality of load-bearing wheels are present. The pivot axis of the mounting device is arranged here at a spacing from the load-bearing wheels. The chassis is prevented from tilting perpendicularly to the transport direction about a horizontal axis by corresponding counter wheels which lie against the guide rail from below.

Depending on the position of the mounting device and the object mounted thereon and the forces acting on the chassis, it is possible with this arrangement that at least one of the load-bearing wheels may move somewhat away from its running surface. This reduces the contact pressure of the particular wheel on the running surface, which can become low enough for this wheel to slip, particularly upon starting or braking of the conveyor carriage. This has an adverse effect on the drive power as a whole and particularly the acceleration or braking power.

SUMMARY OF THE INVENTION

Therefore, an object of the present invention is to provide a conveyor system and an immersion treatment system of the type mentioned at the outset which take these issues into account.

In the conveyor system of the type mentioned at the outset, this object may be achieved in that d) the axis of rotation of the at least one load-bearing wheel and the pivot axis of the mounting device are arranged coaxially to one another.

It has been shown that the contact pressure of the load-bearing wheel on the guide rail or its associated running surface thus remains reliably maintained irrespective of the movement direction of the conveyor carriage and irrespective of whether the conveyor carriage is accelerated or slowed down or moved at a constant speed along the guide rail.

Moreover, with the coaxial arrangement of the axis of rotation of the load-bearing wheel and the pivot axis of the mounting device, it is possible for the chassis, and therefore the conveyor carriage, to be of a relatively compact construction by comparison with known conveyor carriages.

It is favourable if the pivot axis of the mounting device is specified by an axis of rotation which is supported on the chassis at a first end.

In this case, the axis of rotation can advantageously support the load-bearing wheel.

It is indeed possible for the conveyor carriage to comprise a plurality of load-bearing wheels. However, if its chassis as such only supports a single load-bearing wheel, it can be of a particularly compact construction.

The second end of the rotary shaft can be advantageously carried along passively. In this case, the second end of the rotary shaft can, for example, support a second load-bearing wheel although this cannot be associated with the chassis.

If the load-bearing wheel is driven, each conveyor carriage can be controlled and moved individually.

This may not be readily possible for example when a chain conveyor is used as the drive.

It is advantageous if the pivot axis of the mounting device is a first pivot axis and the mounting device can moreover be pivoted about a second pivot axis which is at a spacing from the first pivot axis. This increases the number of degrees of freedom of movement of the object to be treated.

If drive devices by means of which the mounting device can be pivoted about the first pivot axis and/or about the second pivot axis are present, it is possible to achieve a continuous movement sequence when guiding the object through an immersion tank.

It is particularly favourable here if the drive devices are arranged in such a way that the mounting device can be pivoted about the first pivot axis or about the second pivot axis independently of one another. The movement sequence of the object can thus be adapted individually to the conditions on site and/or to the object to be treated.

The above-mentioned object may be achieved with an immersion treatment system of the type mentioned at the outset in that
c) the conveyor system is constructed according to one of the embodiments of the invention disclosed herein.

The advantages of an immersion treatment system which is designed in this way correspond analogously to the advantages mentioned above in relation to the conveyor system.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, which show.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
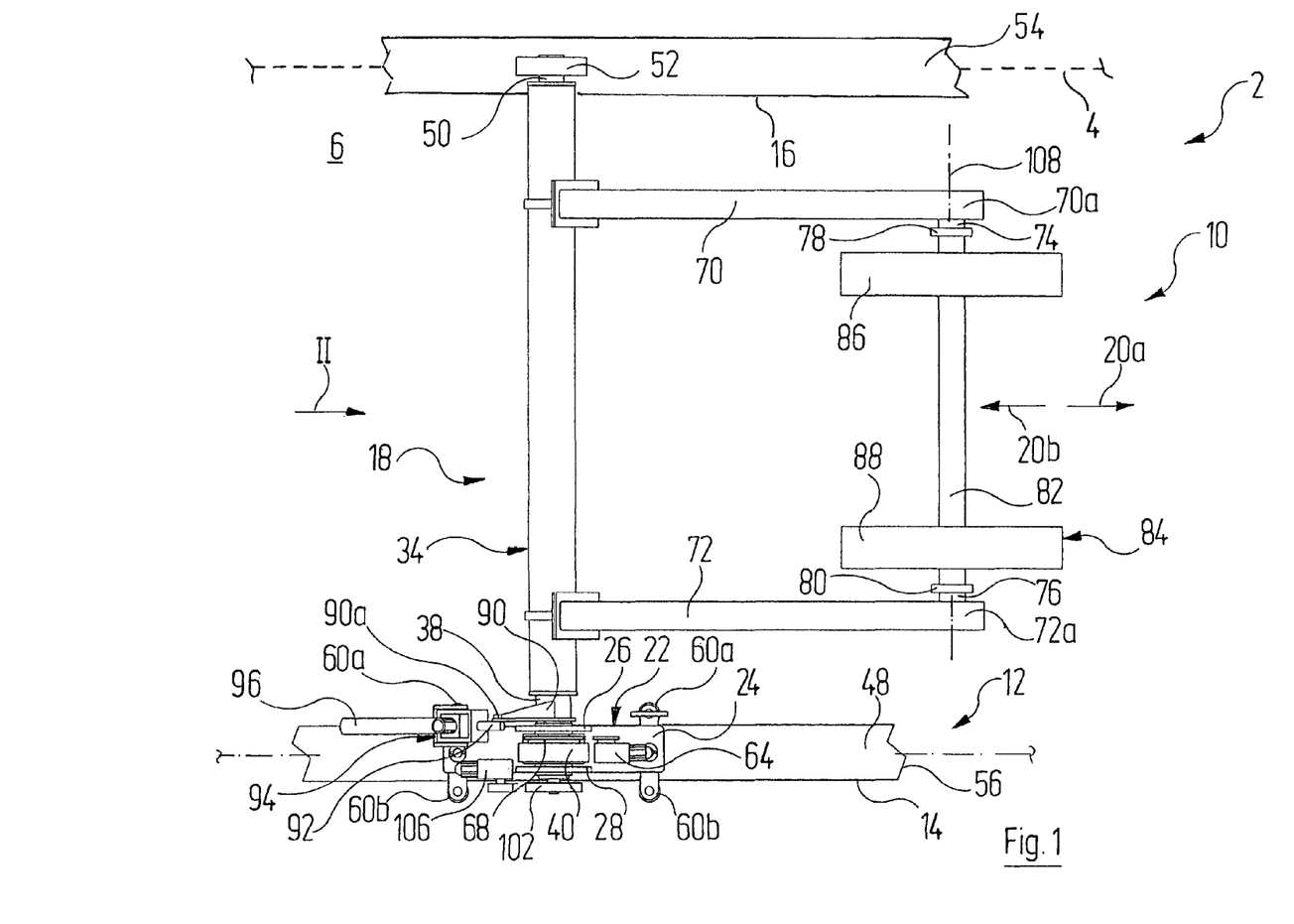
FIG. 1 a view from above of a conveyor carriage of a conveyor system for conveying vehicle bodies, which is used in a cataphoretic immersion painting system.

In FIG. 1, a schematically illustrated cataphoretic immersion painting system is denoted as a whole by 2. This comprises an immersion tank (indicated schematically in FIGS. 1 and 2 by dashed lines) which is filled in known manner with liquid paint 6 up to a certain fluid level (only shown in FIG. 2, where it is denoted by 6a).

Figure 2:
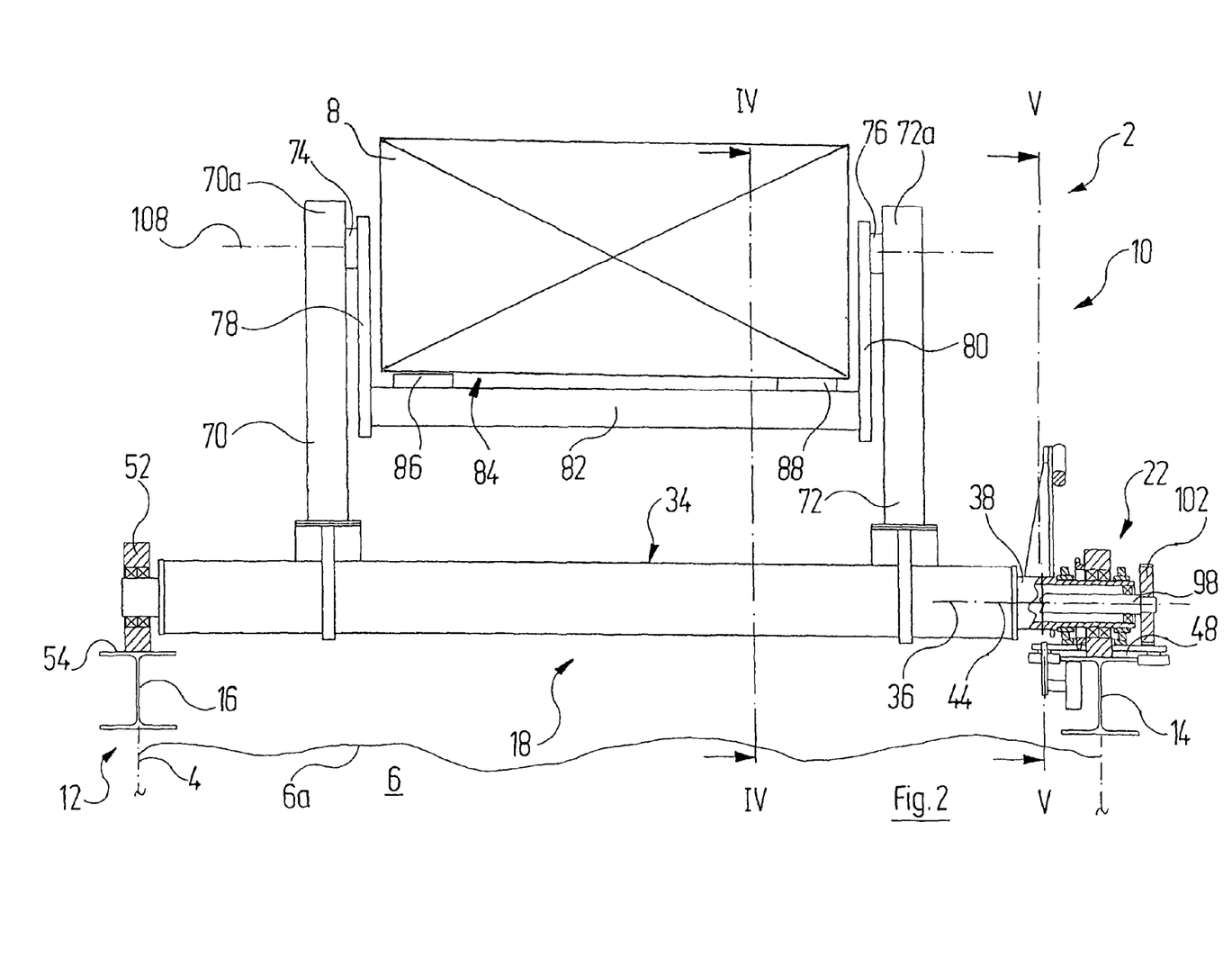
FIG. 2 a view of the conveyor carriage from the direction of the arrow II in FIG. 1, with the conveyor carriage shown in partial section.

The immersion painting system 2 is used to paint objects, vehicle bodies 8 in the illustrated exemplary embodiment, of which a vehicle body 8 is shown greatly simplified only in FIG. 2.

An electrical field is generated in a manner known per se between vehicle bodies 8 to be painted and anodes which are arranged along the movement path of the vehicle bodies 8 and are not shown for reasons of clarity. In this electrical field, the pigment particles contained in the paint 6 migrate towards the vehicle bodies 8 and are deposited thereon. Details of this procedure are generally known and are therefore not explained in more detail here.

With the aid of a conveyor system 10, the vehicle bodies 8 are guided through the immersion painting system 2 and particularly through the immersion tank 4 and the paint 6 located therein. To this end, the conveyor system 10 comprises a rail system 12 with a guide rail 14 and a running rail 16 which extend parallel to one another along the immersion tank 4 on opposite sides thereof.

A plurality of conveyor carriages 18, which each receive a vehicle body 8 and can be moved independently of one another in the direction of the arrow 20a or in the direction of the opposing arrow 20b, run along the rail system 12 (see FIG. 1).

The conveyor carriage 18 comprises a chassis 22 which has a base plate 24 on which two mutually spaced supporting cheeks 26, 28 are mounted, which extend perpendicularly to the base plate 24 and parallel to one another and to the transport direction 20.

Figure 3:
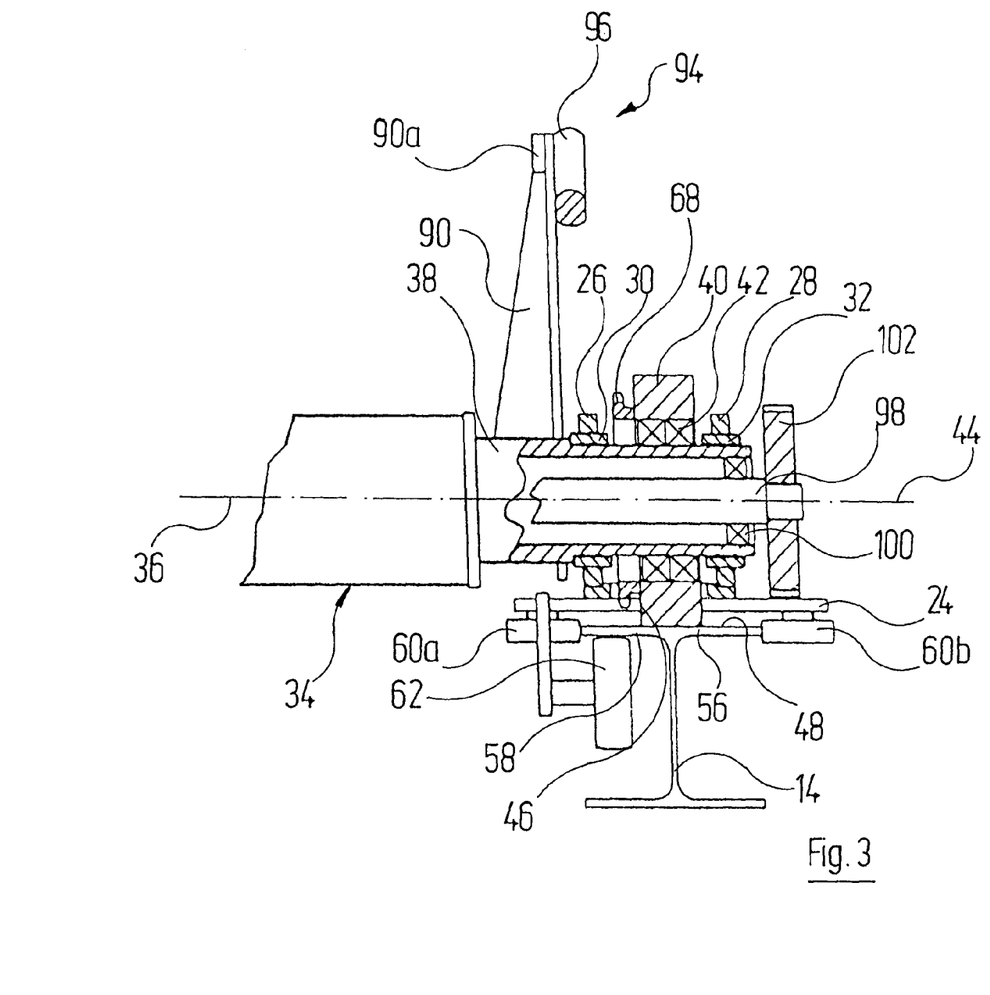
FIG. 3 the partial section of the conveyor carriage according to FIG. 2 on an enlarged scale.

For reasons of clarity, some components which are shown in both FIG. 2 and FIG. 3 are only provided with reference numerals in FIG. 3.

The supporting cheeks 26, 28 hold a respective slide bearing 30, 32 coaxially to one another in corresponding passages, which slide bearings in turn support a rotary shaft 34 which is constructed as a hollow shaft and can be rotated about its longitudinal axis 36. To this end, one end 38 of the rotary shaft 34 is constructed as a shaft connecting piece which is complementary to the slide bearings 30, 32.

A load-bearing wheel 40, which can roll along the rotary shaft 34 in the circumferential direction by means of a ball bearing 42, is arranged in the region between the supporting cheeks 26, 28. The axis of rotation 44 of the wheel 40 and the axis of rotation 36 of the rotary shaft 34 are therefore arranged coaxially to one another and coincide. The axes of rotation 36 and 44 are only shown in FIGS. 2 and 3.

The wheel 40 passes through the base plate 24 via a passage 46 therein and rolls along an upper running surface 48 of the guide rail 14.

The length of the rotary shaft 34 is such that it extends from the chassis 22 over the entire width of the immersion tank 4. At its second end 50, which is remote from the chassis 22, the rotary shaft 34 supports a non-driven roller 52 which rolls along an upper running surface 54 of the running rail 16. The load-bearing wheel 40 and the roller 52 have the same external diameter so that the rotary shaft 34 extends horizontally when the upper running surfaces 48 and 54 of the guide rail 14 and the running rail 16 extend in a common horizontal plane.

As shown in FIGS. 2 and 3, the guide rail 14 is constructed as an I-shaped profile, whereof the upper horizontal profile plate 56 provides the upper running surface 48 and, on the opposite side, a lower running surface 58. In order to stabilise the chassis on the guide rail 14, the base plate 24 supports two pairs of lateral guide rollers 60a and 60b which are rotatable about a vertical axis and each lie laterally against the lateral flanks of the profile plate 56 of the guide rail 14. The base plate 24 moreover supports a pair of counter pressure rollers 62 which are each rotatable about a horizontal axis and each lie against the lower running surface 58 from below and prevent the chassis 22 from tilting about the axis of rotation 44 of the wheel 40.

Figure 5:
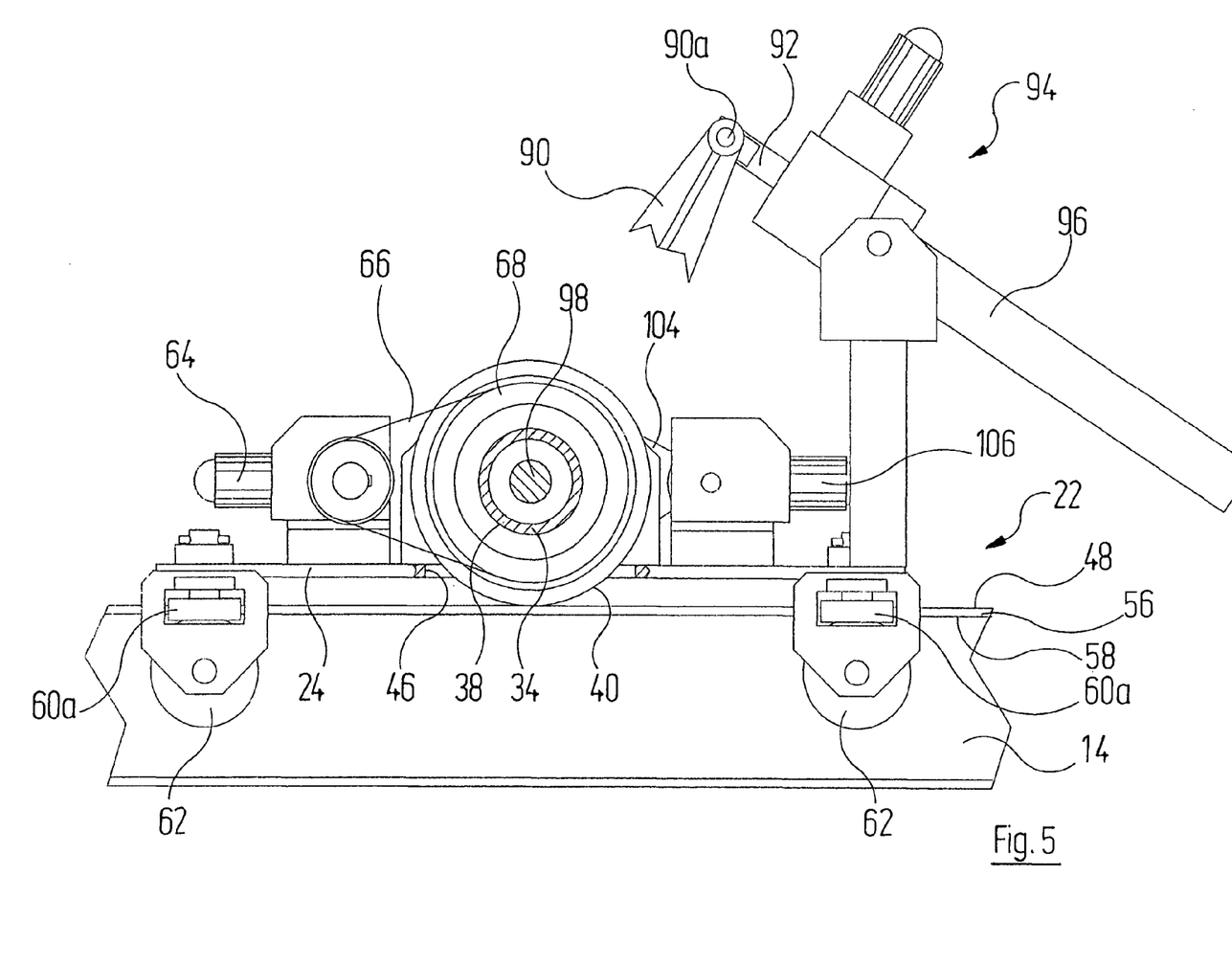
FIG. 5 a section of the conveyor carriage along the section line V-V in FIG. 2 on an enlarged scale.

The load-bearing roller 40 is driven by means of an electric motor 64 and is coupled to this by way of a chain 66 shown in FIG. 5. To this end, a toothed ring 68, which cooperates with the chain 66, is mounted on a flank of the load-bearing wheel 40. It is also alternatively possible to provide a belt drive, for example.

The rotary shaft 34 supports two mutually parallel-extending pivot arms 70 and 72 which are constructed as a hollow profile and extend away from the rotary shaft 34 in the radial direction. The pivot arms 70 and 72 are rigidly connected to the rotary shaft 34, with a respective passage (not shown in the Figures) being present between the inside of the rotary shaft 34 and the inside of the pivot arms 70 and 72.

The free ends 70a or 72a of the pivot arms 70 and 72 which are remote from the rotary shaft 34 are each connected in articulated manner to a pivot lug 78, 80 by way of a drivable stub shaft 74, 76. The ends 78a, 80a of the pivot lugs 78, 80 which are remote from the stub shafts 74, 76 are coupled to one another by way of a transverse crossbar 82 extending parallel to the rotary shaft 34. The transverse crossbar 82 rigidly supports a mounting device 84 in the form of two parallel-extending supporting struts 86, 88 on which a vehicle body 8 to be painted can be mounted with or without a conveyor skid, as is known per se.

So that the rotary shaft 34 can be rotated about its axis of rotation 36, it is rigidly connected in the region of the chassis 22 of the conveyor carriage 18 to a coupling lever 90 which extends in the radial direction away from the rotary shaft 34. The end 90a of the coupling lever 90 which is remote from the rotary shaft 34 is connected to the spindle 92 of a spindle drive 94, as is known per se. The spindle 92 can be extended or retracted with respect to a spindle housing 96. Depending on whether the spindle 92 of the spindle drive 94 is extended or retracted, the rotary shaft 34 rotates in one or the other direction about its axis of rotation as a result of being coupled to the spindle 92 by way of the coupling lever 90.

The pivot arms 70, 72 are also pivoted about the axis of rotation 36 of the rotary shaft 34 with the mounting device 84 here.

The axis of rotation 36 of the rotary shaft is therefore at the same time a first pivot axis of the mounting device 84.

The maximum angle about which the pivot arms 70, 72 and the mounting device 84 can be pivoted about this pivot angle 36 depends on the length of the spindle 92 of the spindle drive 94. The longer this is, and the further this can be extended from the spindle housing 96, the greater the maximum pivot angle.

Extending inside the rotary shaft 34, there is moreover an inner shaft 98 which is coaxial thereto and is rotatably mounted by means of ball bearings 100. The inner shaft 98 projects out of the shaft connecting piece 38 of the rotary shaft 34 and supports a toothed wheel 102 at its free end.

Figure 4:
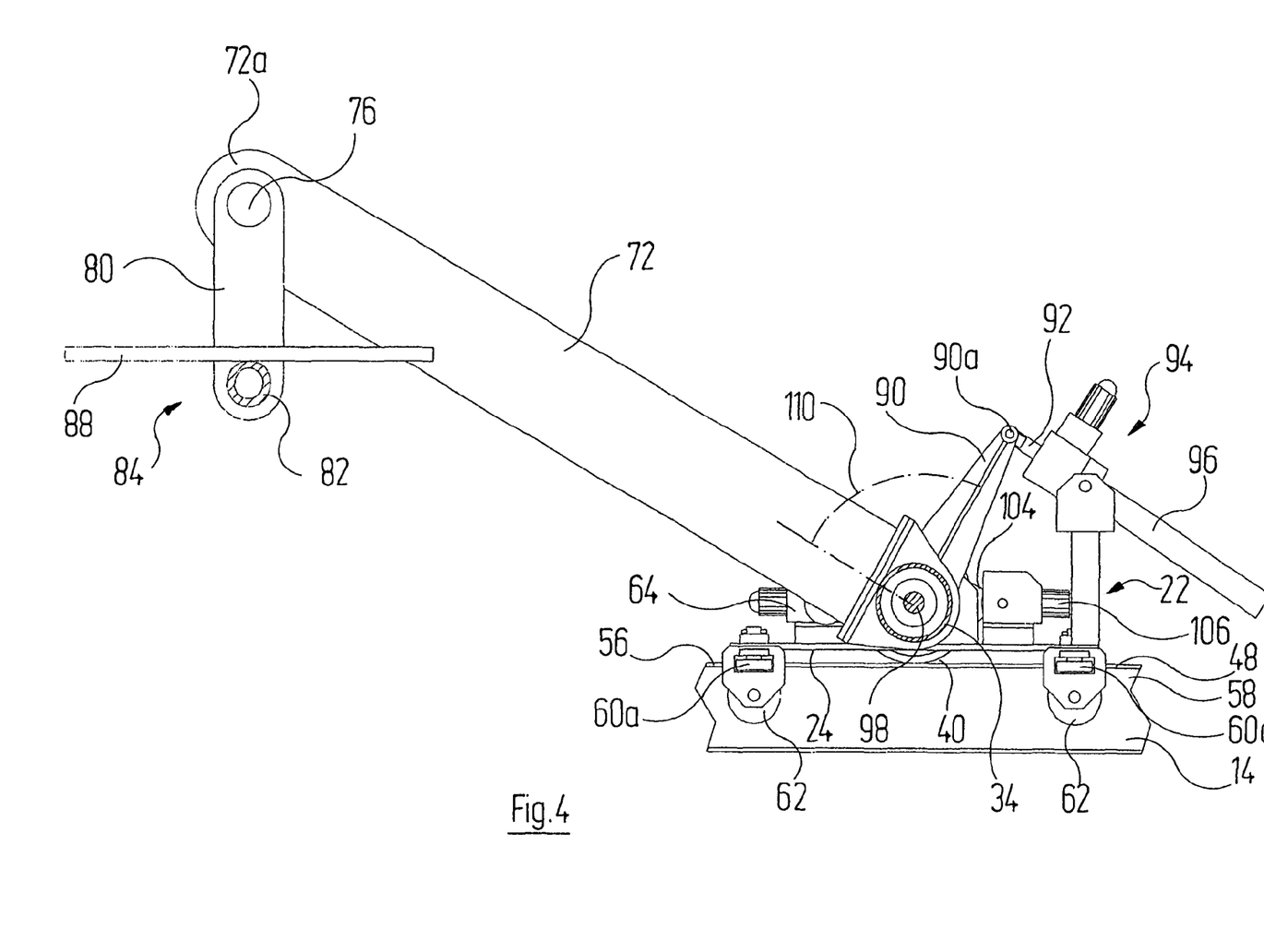
FIG. 4 a section of the conveyor carriage along the section line IV-IV in FIG. 2.
Figure 6:
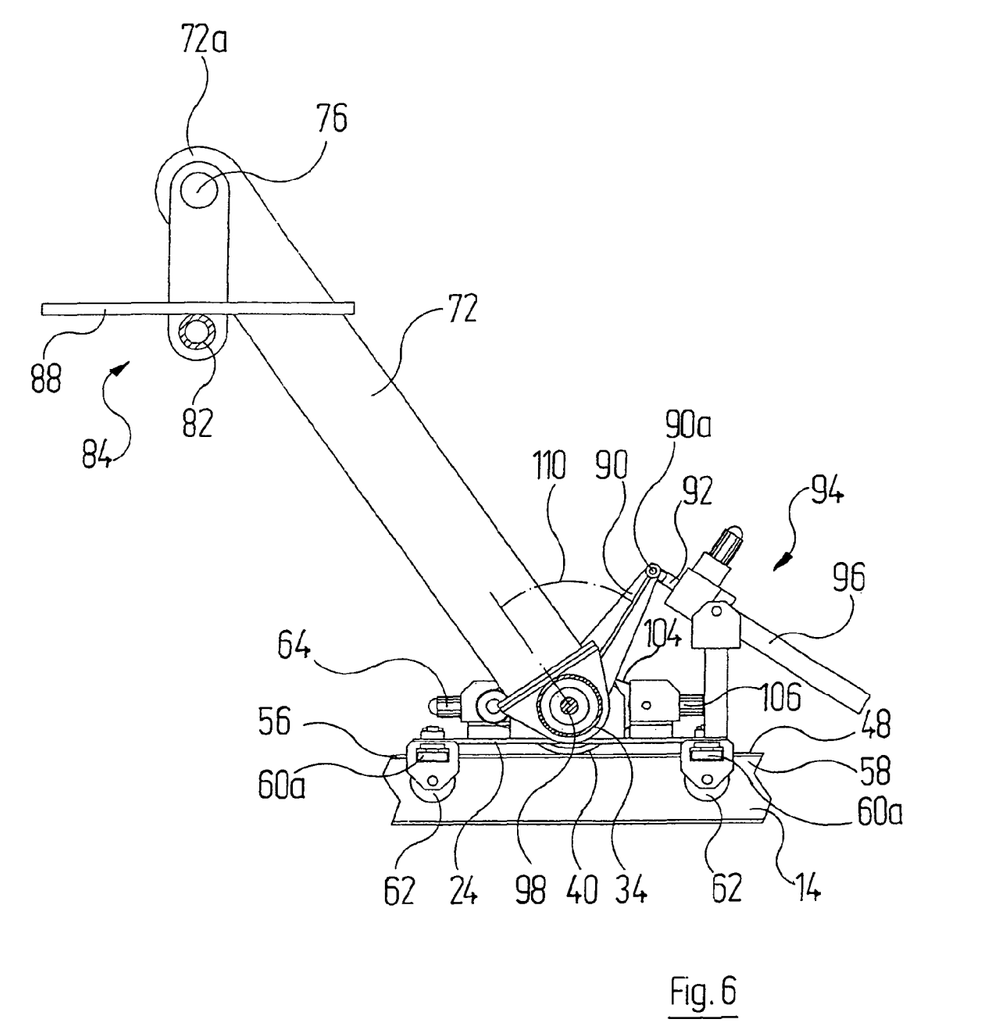
FIG. 6 a view corresponding to FIG. 4 of a modified conveyor carriage.

This is coupled by way of a chain 104 (parts of which are shown in FIGS. 4 to 6) to an electric motor 106 by means of which the inner shaft 98 can be rotated in both possible directions about its longitudinal axis. It is also alternatively possible to provide a belt drive here.

By way of the inner regions of the rotary shaft 34 and the pivot arms 70, 72, the stub shafts 74, 76 are coupled in a manner known per se to the inner shaft 98 in such a way that a rotation of the inner shaft 98 leads to a corresponding rotation of the stub shafts 74, 76. If required, a further gear between the inner shaft 98 and the stub shafts 74, 76 can serve to increase or reduce the speed of the rotational movement of the inner shaft 98.

If the inner shaft 98 is therefore rotated by means of the electric motor 106, this results in a corresponding rotation of the stub shafts 74, 76 and therefore to a pivotal movement of the pivot lugs 78, 80. All in all, the mounting device 84 is thus pivoted about a second pivot axis 108 specified by the stub shafts 75, 76.

As a result of the independent drives, namely the spindle drive 94 and electric motor 106, the rotary shaft 34 and the inner shaft 98 can therefore be rotated independently of one another. This enables the mounting device 84 to be pivoted about the pivot axis 36 or about the pivot axis 108 independently of one another, with simultaneous pivoting about both axes 36 and 108 also being possible.

All in all, the conveyor system 10 therefore enables a movement sequence of the vehicle body to be realised which is created by superimposing a translatory movement, a first pivotal movement about the first pivot axis 36 formed by the axis of rotation 36 of the rotary shaft 34 and a second pivotal movement about the second pivot axis 108 specified by the stub shafts 75, 76.

It is also possible for only a translatory movement or only a pivotal movement about the first pivot axis 36 or only a pivotal movement about the second pivot axis 108 of the vehicle body 8 or a combination of two of these movements in each case to take place.

The coupling lever 90 forms a predetermined angle with the pivot arms 70, 72 when projecting into a common plane, which angle is 90° in the present exemplary embodiment and is denoted by the reference numeral 110 in FIGS. 4 and 6. If the spindle 92 is retracted as far as possible into the spindle housing 96, the pivot arms 70, 72 assume a position in which their free ends 70a, 72a occupy their highest position. This is shown in FIG. 4. The vertical position of the running surface 48 of the guide rail 14 can serve for example as a reference height.

The maximum achievable height of the free ends 70a, 72a of the pivot arms 70, 72 can be adjusted depending on the angle 110 formed by the coupling lever 90 and the pivot arms 70, 72.

FIG. 6 shows for example a modification of the conveyor carriage 18 in which this angle 110 is smaller than 90° and is approximately only 65°. As is clearly shown by comparison with FIG. 4, the free ends 70a, 72a of the pivot arms 70, 72 are arranged higher here in relation to the running surface 48 of the guide rail 14 if the spindle 92 is retracted as far as possible into the spindle housing 96.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A conveyor system for conveying objects in an immersion treatment system comprising:
   a) at least one conveyor carriage which
      aa) comprises a chassis supporting at least one load-bearing wheel which is rotatable about an axis of rotation;
      ab) comprises a mounting device which is pivotable about a pivot axis and on which at least one object is mountable;
   b) a guide rail along which the at least one load-bearing wheel runs; and,
   c) drive means for moving the conveyor carriage along the guide rail, wherein
   d) the axis of rotation of the at least one load-bearing wheel and the pivot axis of the mounting device are arranged coaxially to one another;
   e) wherein, the pivot axis is specified by a rotary shaft which is mounted on the chassis at a first end and a second end of the rotary shaft is carried along passively.

2. The conveyor system according to claim 1, wherein the rotary shaft supports the load-bearing wheel.

3. The conveyor system according to claim 2, wherein the chassis only supports a single load-bearing wheel.

4. The conveyor system according to claim 1, wherein the load-bearing wheel is driven.

5. The conveyor system according to claim 1, wherein the pivot axis of the mounting device is a first pivot axis and the mounting device is also pivotable about a second pivot axis which is at a spacing from the first pivot axis.

6. The conveyor system according to claim 5, wherein drive devices are present, by means of which the mounting device is pivoted about the first pivot axis and/or about the second pivot axis.

7. The conveyor system according to claim 6, wherein the drive devices are arranged in such a way that the mounting device is pivoted about the first pivot axis or about the second pivot axis independently of one another.

8. An immersion treatment system having
   a) at least one immersion tank which is fillable with a treatment fluid in which objects to be treated can be immersed;

b) a conveyor system which can move the objects to be treated towards the immersion tank, into the interior of the immersion tank, out of the immersion tank and away from the immersion tank, wherein c) the conveyor system is constructed according to claim 1.

9. A conveyor system for conveying objects in an immersion treatment system comprising:
  a) at least one conveyor carriage which
    aa) comprises a chassis supporting at least one load-bearing wheel which is rotatable about an axis of rotation;
    ab) comprises a mounting device which is pivotable about a pivot axis and on which at least one object is mountable;
  b) a guide rail along which the at least one load-bearing wheel runs; and,
  c) drive means for moving the conveyor carriage along the guide rail, wherein
  d) the axis of rotation of the at least one load-bearing wheel and the pivot axis of the mounting device are arranged coaxially to one another;
  e) wherein the pivot axis of the mounting device is a first pivot axis and the mounting device is also pivotable about a second pivot axis which is at a spacing from the first pivot axis.

10. The conveyor system according to claim 9, wherein the pivot axis of the mounting device is specified by a rotary shaft which is mounted on the chassis at a first end.

11. The conveyor system according to claim 10, wherein the rotary shaft supports the load-bearing wheel.

12. The conveyor system according to claim 11, wherein the chassis only supports a single load-bearing wheel.

13. The conveyor system according to claim 9, wherein the load-bearing wheel is driven.

14. The conveyor system according to claim 9, wherein drive devices are present, by means of which the mounting device is pivoted about the first pivot axis and/or about the second pivot axis.

15. The conveyor system according to claim 14, wherein the drive devices are arranged in such a way that the mounting device is pivoted about the first pivot axis or about the second pivot axis independently of one another.

16. An immersion treatment system having
  a) at least one immersion tank which is fillable with a treatment fluid in which objects to be treated can be immersed;
  b) a conveyor system which can move the objects to be treated towards the immersion tank, into the interior of the immersion tank, out of the immersion tank and away from the immersion tank, wherein c) the conveyor system is constructed according to claim 9.

* * * * *